United States Patent
Sun et al.

(10) Patent No.: US 11,113,799 B2
(45) Date of Patent: Sep. 7, 2021

(54) DISPLAY METHOD AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yukun Sun, Beijing (CN); Xuefeng Wang, Beijing (CN); Jinghua Miao, Beijing (CN); Wenyu Li, Beijing (CN); Jinbao Peng, Beijing (CN); Bin Zhao, Beijing (CN); Lixin Wang, Beijing (CN); Xi Li, Beijing (CN); Qingwen Fan, Beijing (CN); Jianwen Suo, Beijing (CN); Yali Liu, Beijing (CN); Yu Lei, Beijing (CN); Yakun Wang, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 83 days.

(21) Appl. No.: 16/621,941

(22) PCT Filed: Jan. 2, 2019

(86) PCT No.: PCT/CN2019/070091
§ 371 (c)(1),
(2) Date: Dec. 12, 2019

(87) PCT Pub. No.: WO2019/192229
PCT Pub. Date: Oct. 10, 2019

(65) Prior Publication Data
US 2020/0118256 A1 Apr. 16, 2020

(30) Foreign Application Priority Data

Apr. 2, 2018 (CN) .......................... 201810283223.1

(51) Int. Cl.
*G06T 5/00* (2006.01)
*G02B 7/02* (2021.01)

(52) U.S. Cl.
CPC ............... *G06T 5/006* (2013.01); *G02B 7/02* (2013.01); *G06T 2207/10012* (2013.01)

(58) Field of Classification Search
None
See application file for complete search history.

(56) References Cited

U.S. PATENT DOCUMENTS 9,916,690 B2 3/2018 Nobori et al.
10,067,349 B2 9/2018 Chen
(Continued)

FOREIGN PATENT DOCUMENTS

CN 104704818 A 6/2015
CN 105192982 A 12/2015
(Continued)

OTHER PUBLICATIONS

First office action dated Mar. 2, 2020 for application No. CN201810283223.1 with English translation attached.

*Primary Examiner* — Frank S Chen
(74) *Attorney, Agent, or Firm* — Nath, Goldberg & Meyer; Joshua B. Goldberg

(57) ABSTRACT

A display method and a display device are provided. The display method may be applied to a display device having a lens unit and a display unit for normal display, and may include steps of: detecting a first distance between the lens unit and the display unit; calculating correction information according to the first distance and transmitting the correction information to the display unit; and displaying a corrected (Continued)

image by the display unit according to the correction information, so that the corrected image is converged into eyes of a user via the lens unit, wherein the corrected image is obtained by correcting an original image according to the first distance.

20 Claims, 5 Drawing Sheets

(56) References Cited

U.S. PATENT DOCUMENTS

| | | | |
|---|---|---|---|
| 10,180,581 B2 | 1/2019 | Li et al. | |
| 2015/0103152 A1* | 4/2015 | Qin | G02B 27/0176 |
| | | | 348/53 |
| 2016/0103318 A1* | 4/2016 | Du | G02B 27/0068 |
| | | | 345/633 |
| 2017/0160518 A1 | 6/2017 | Lanman et al. | |
| 2018/0048882 A1 | 2/2018 | Eash et al. | |

FOREIGN PATENT DOCUMENTS

| | | |
|---|---|---|
| CN | 105455285 A | 4/2016 |
| CN | 105911694 A | 8/2016 |
| CN | 105979243 A | 9/2016 |
| CN | 107942514 A | 4/2018 |

* cited by examiner

Image actually displayed on a display unit

Image seen by human eyes

DISPLAY METHOD AND DISPLAY DEVICE

CROSS-REFERENCE TO RELATED APPLICATION

This is a National Phase Application filed under 35 U.S.C. 371 as a national stage of PCT/CN2019/070091, filed Jan. 2, 2019, an application claiming the benefit of Chinese Patent Application No. 201810283223.1 filed on Apr. 2, 2018, the disclosure of each of which is hereby incorporated by reference in its entirety.

TECHNICAL FIELD

The present disclosure relates to the field of display device technology, in particular, to a display method and a display device.

BACKGROUND

Virtual Reality (VR) display technology has developed rapidly in recent years. A virtual reality display device may include a display unit and a lens unit when implementing a normal display function. To meet the needs of different users (e.g., nearsighted persons), a distance (i.e., an object distance) between the display unit and the lens unit may be adjustable. In this case, if an image to be displayed is displayed in a fixed manner, the display effect thereof may be poor, and may cause visual fatigue and affect viewing experience.

SUMMARY

The embodiments of the present disclosure provide a display method and a display device.

Some embodiments of the present disclosure provide a display method for a display device having a lens unit and a display unit for normal display. The display method includes following steps:

detecting a first distance between the lens unit and the display unit;

calculating correction information according to the first distance and transmitting the correction information to the display unit; and displaying a corrected image by the display unit according to the correction information, so that the corrected image is converged into eyes of a user via the lens unit, wherein the corrected image is obtained by correcting an original image according to the first distance.

In an embodiment, the step of calculating the correction information according to the first distance includes: calculating the corrected image, as the correction information, according to the first distance and the original image; and the step of displaying the corrected image by the display unit according to the correction information includes: displaying the corrected image by the display unit.

In an embodiment, the step of calculating the correction information according to the first distance includes: calculating a correction instruction, as the correction information, according to the first distance; and the step of displaying the corrected image by the display unit according to the correction information includes: obtaining the corrected image by correcting the original image by the display unit according to the correction instruction and displaying the corrected image by the display unit.

In an embodiment, the step of calculating correction information according to the first distance and transmitting the correction information to the display unit includes:

determining whether the first distance is changed with respect to a previous first distance;

in a case that the first distance is changed with respect to the previous first distance, updating the correction information according to the changed first distance and transmitting the updated correction information to the display unit; and in a case that the first distance is not changed with respect to the previous first distance, obtaining the correction information according to the previous first distance and transmitting the correction information to the display unit.

In an embodiment, the step of obtaining the corrected image by correcting the original image by the display unit according to the correction instruction includes:

determining, by the display unit, whether a received correction instruction is updated with respect to a previous correction instruction;

in a case that the received correction instruction is updated with respect to the previous correction instruction, correcting the original image according to the updated correction instruction to obtain the corrected image; and in a case that the received correction instruction is not updated with respect to the previous correction instruction, correcting the original image according to the previous correction instruction to obtain the corrected image.

In an embodiment, the step of detecting the first distance between the lens unit and the display unit includes steps of:

detecting a second distance in a predetermined direction between the lens unit and the display unit using a distance sensor fixedly coupled to the lens unit; and calculating the first distance according to the predetermined direction and the second distance.

In an embodiment, the step of calculating the first distance according to the predetermined direction and the second distance includes:

calculating the first distance by a formula of $d=(S+S_0)*\cos\theta$, where d is the first distance, S is the second distance, $S_0$ is a distance in the predetermined direction between a distance measurement starting point of the distance sensor and a center plane of the lens unit, and $\theta$ is an angle between the predetermined direction and a direction of the first distance.

In an embodiment, the step that the corrected image is obtained by correcting an original image according to the first distance includes:

searching for prestored correction information corresponding to the first distance according to the first distance; and correcting the original image according to the correction information to obtain the corrected image.

Some embodiments of the present disclosure provide a display device including:

a lens unit configured to converge light emitted from a display unit into eyes of a user;

an adjustor configured to adjust a first distance between the lens unit and the display unit;

a distance measurement unit configured to detect the first distance; and a corrector configured to calculate correction information according to the first distance and transmit the correction information to the display unit so as to control the display unit to display a corrected image according to the correction information, wherein the corrected image is obtained by correcting an original image according to the first distance.

In an embodiment, the display device is a virtual reality display device, the display unit includes a first display subunit and a second display subunit; and the lens unit includes:

a first lens subunit configured to converge light emitted from the first display subunit into a left eye of the user; and a second lens subunit configured to converge light emitted from the second display subunit into a right eye of the user.

In an embodiment, the adjustor is configured to adjust a first sub-distance between the first lens subunit and the first display subunit, and adjust a second sub-distance between the second lens subunit and the second display subunit, the first sub-distance and the second sub-distance are adjusted independently of each other; and the corrector is configured to calculate first correction information according to the first sub-distance and transmit the first correction information to the first display subunit so as to control the first display subunit to display a first corrected image according to the first correction information, wherein the first corrected image is obtained by correcting a first original image according to the first sub-distance; the corrector is further configured to calculate second correction information according to the second sub-distance and transmit the second correction information to the second display subunit so as to control the second display subunit to display a second corrected image according to the second correction information, wherein the second corrected image is obtained by correcting a second original image according to the second sub-distance.

In an embodiment, the adjustor includes a first adjustor having a guide rail and a second adjustor having a guide rail;

at least one of the first display subunit or the first lens subunit is mounted on the first adjustor via a fastener; and at least one of the second display subunit or the second lens subunit is mounted on the second adjustor via a fastener.

In an embodiment, the correction information includes a correction instruction;

the corrector is further configured to determine whether the first distance is changed with respect to a previous first distance;

in a case that the first distance is changed with respect to the previous first distance, the corrector updates the correction information according to the changed first distance and transmit the updated correction information to the display unit; and in a case that the first distance is not changed with respect to the previous first distance, the corrector obtains the correction information according to the previous first distance and transmit the correction information to the display unit.

In an embodiment, the correction information includes a correction instruction;

the corrector is further configured to determine whether a received correction instruction is updated with respect to a previous correction instruction;

in a case that the received correction instruction is updated with respect to the previous correction instruction, the display unit corrects the original image according to the updated correction instruction to obtain the corrected image; and in a case that the received correction instruction is not updated with respect to the previous correction instruction, the display unit corrects the original image according to the previous correction instruction to obtain the corrected image.

In an embodiment, the display device further includes:

the display unit which is electrically connected to the corrector.

In an embodiment, the display device further includes:

a mounting unit for detachably mounting the display unit.

In an embodiment, the corrector is configured to transmit the correction information wirelessly to the display unit.

In an embodiment, the distance measurement unit includes:

a distance sensor fixedly coupled to the lens unit and configured to detect a second distance in a predetermined direction between the lens unit and the display unit; and a calculator configured to calculate the first distance according to the predetermined direction and the second distance.

In an embodiment, the distance sensor is an infrared distance sensor.

In an embodiment, the display device further includes:

a memory prestoring therein a plurality of first distances, a plurality of correction instructions, and correspondence relationships between the plurality of first distances and the plurality of correction instructions;

wherein the corrector searches for a prestored correction instruction corresponding to a current first distance according to the current first distance, and corrects the original image according to the found correction instruction to obtain the corrected image.

DETAILED DESCRIPTION

In order to make those skilled in the art better understand the technical solutions of the present disclosure, the present disclosure will be further described in detail below in conjunction with the accompanying drawings and specific implementations.

Figure 1:
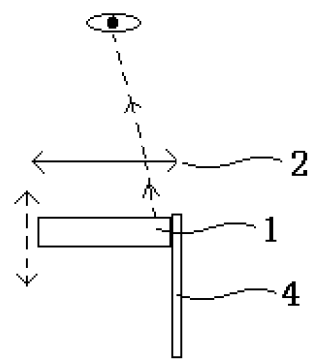
FIG. 1 is a structural diagram of a virtual reality display device according to an embodiment of the present disclosure.
Figure 2:
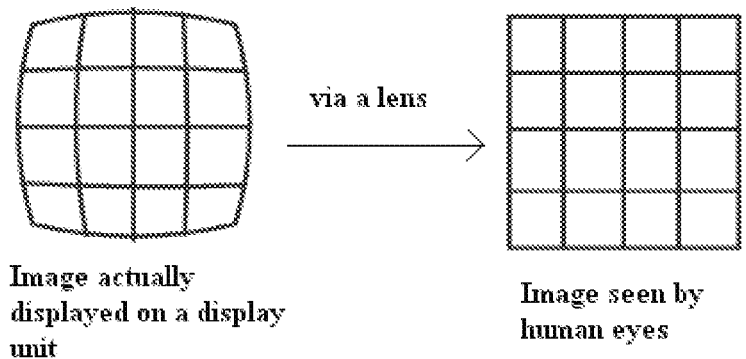
FIG. 2 is a schematic diagram of a correspondence relationship between an actually displayed image and an image seen by a user's eyes, according to an embodiment of the present disclosure.

As shown in FIG. 1, an embodiment of the present disclosure provides a virtual reality (VR) display device. The VR display device may be VR glasses, a VR helmet, or the like. The VR display device may include a display unit 1 and a lens unit 2. Light from different images displayed on different regions (for example, left and right regions) of the display unit 1 passes through the lens unit 2 and enters the left and right eyes of a user, respectively, so that the eyes see different images, and the user feels that a stereoscopic image (a virtual image) is seen. In an embodiment, the lens unit 2 may include one or more lenses. Different positions of the lens unit 2 cause the light incident on these positions to exit in different directions, i.e., different positions of the lens unit 2 have different distortion coefficients. In order to allow the light from an image to form a proper image in the user's eye after passing through the lens, the anti-distortion is performed. That is, the image displayed on the display unit 1 is deformed relative to the image to be displayed (also referred to as "original image"). The deformation in the image displayed on the display unit 1 and the deformation generated due to the displayed image passing through the lens unit 2 counteract each other, so that the user finally sees the proper original image. For example, as shown in FIG. 2, if it is intended to make the user see the image of the square grid (i.e., the original image), the grid image actually displayed on the display unit 1 is deformed.

In an embodiment, the VR display device may further include a memory which prestores therein corresponding mapping relationships (hereinafter referred to as "correction instructions") between an original image (as shown in the right portion of FIG. 2) and an actually displayed image (as shown in the left portion of FIG. 2) on the display unit 1 in cases of various object distances (hereinafter referred to as "first distances"). In other words, the correction instructions may be mapping relationships between the data of the original image (or the image to be displayed) and the screen coordinates. Thus, the deformation in the image displayed on the display unit 1 differs depending on the object distances, and counteracts the deformation generated due to the displayed image passing through the lens unit 2, so that the user can see the proper original image at various object distances. In one embodiment, the memory may be a memory (e.g., a non-volatile memory, a flash memory, etc.) in the display unit 1. In one embodiment, each of the mapping relationships (or each of the correction instructions) may be obtained experimentally in advance and prestored in advance in the memory.

In an embodiment, the VR display device may further include an adjustor 4. The adjustor 4 may be a support having a guide rail. The display unit 1 may be mounted on the adjustor 4 by fasteners (e.g., clamps, bolts, etc.), and the display unit 1 may be moved closer to or away from the lens unit 2 along the guide rail of the adjustor 4 by adjusting the fasteners, thereby adjusting the distance between the display unit 1 and the lens unit 2 (i.e., the object distance). In this way, the VR display device can be adapted to various users (e.g., nearsighted persons), and a user can adjust the distance between the display unit 1 and the lens unit (e.g., the lens) 2 (i.e., the object distance) by using the adjustor 4.

Figure 3:
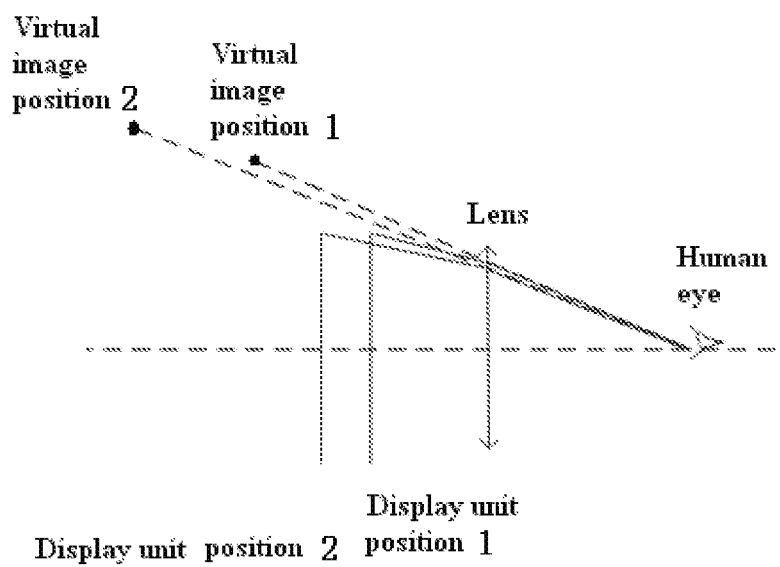
FIG. 3 is a schematic diagram showing the principle that the display effect changes when the object distance changes, according to an embodiment of the present disclosure.

As shown in FIG. 3, as the object distance is changed, the position on the lens at which light emitted at a same angle from a same point in the display unit 1 is incident is changed, that is, the corresponding distortion coefficient is changed. In addition, the angle of the light after passing through the lens (the visual angle) is also changed, and the position of a virtual image of that point is also changed. Thus, when the object distance is changed, all points on the virtual image actually seen by the user are displaced. In the VR display device according to the present embodiment, since the deformation in the image displayed on the display unit 1 is different dependent on the object distances, and counteracts the deformation generated due to the displayed image passing through the lens unit 2, thereby preventing the depth of field, the parallax, and the like, from being changed, and improving the display effect. Moreover, the user's eyes do not need to make any adjustments according to the change in the object distance, reducing or avoiding the visual fatigue and improving the user's viewing experience.

Figure 5:
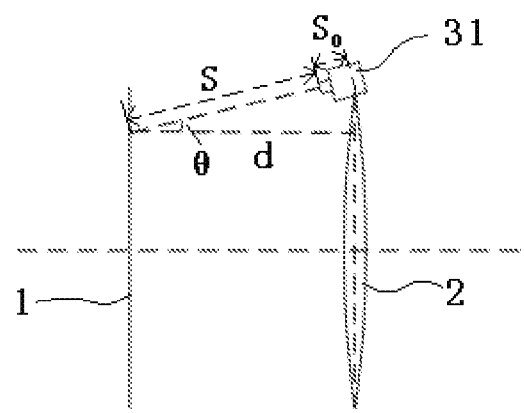
FIG. 5 is a schematic diagram showing the principle that a display device according to an embodiment of the present disclosure measures a first distance.
Figure 6:
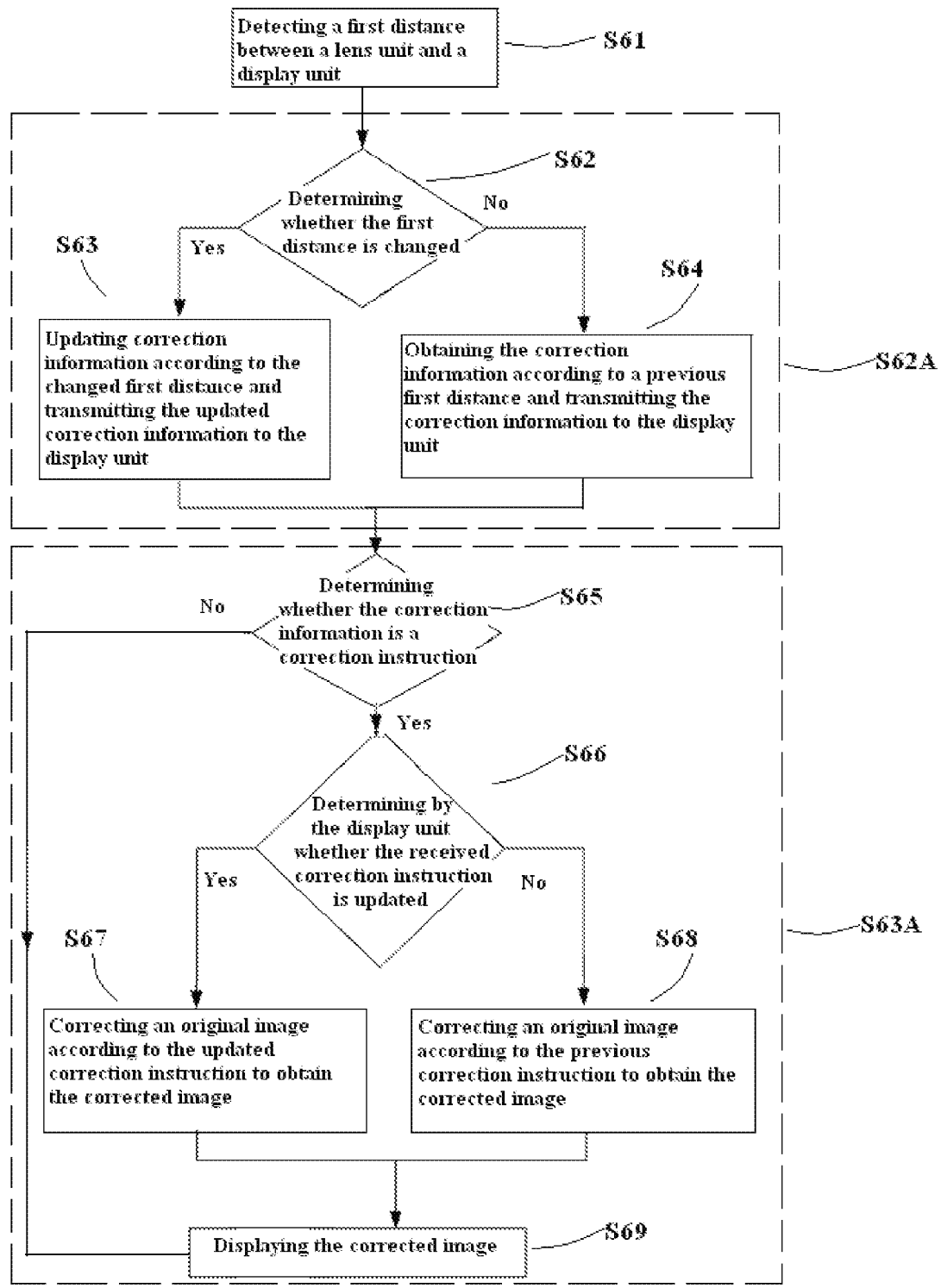
FIG. 6 is a flow chart of a display method according to an embodiment of the present disclosure.

As shown in FIG. 6, an embodiment of the present disclosure provides a display method for a display device (e.g., a VR display device) having the lens unit 2 and the display unit 1 for normal display. Referring to FIGS. 4 to 8, the display method may include the following steps S61, S62A and S63A.

Step S61 includes: detecting a first distance (e.g., the current first distance) between the lens unit 2 and the display unit 1. As described above, the first distance may be the object distance.

Step S62A includes: calculating correction information according to the first distance and transmitting the correction information to the display unit 1. In an embodiment, the correction information may be a correction instruction (i.e., a mapping relationship between an original image (or an image to be displayed) and an image actually displayed on the display unit 1). Alternatively, the correction information may be data of an image after being corrected (i.e., the image actually displayed on the display unit 1, which hereinafter may be referred to as "corrected image"). It should be understood that, in Step S61, if the current first distance is identical to a previous first distance, the correction information does not need to be updated, and thus the method may perform Step S63A in FIG. 6 directly.

Step S63A includes: displaying the corrected image by the display unit 1 according to the correction information, so that the corrected image is converged into eyes of a user via the lens unit 2, wherein the corrected image is obtained by correcting the original image according to the first distance.

In a display device to which the display method in the present embodiment is applicable, the image displayed by the display unit 1 is converged into the user's eyes by the lens unit 2 (which includes one or more lenses).

In this method, the first distance (i.e., the object distance) between the lens unit 2 and the display unit 1 may be detected in real time, then the correction information is obtained according to the first distance, and the display unit 1 displays the corrected image, which is obtained in essence by correcting the original image according to the first distance, according to the correction information. That is, by the above correction, the image distortion in the user's eyes generated by the change in the first distance is eliminated. In other words, tor a same original image, the virtual images, formed by the lens unit 2, of the corrected images respectively obtained for different first distances are the same (for example, the virtual images have a same shape); that is to say, the images formed in the user's eyes are the same. For example, the first distance (i.e., the object distance) may be a distance between a principal plane of the lens unit 2 and a light outgoing surface of the display unit 1. The principal plane of the lens unit 2 is a plane that passes through the optical center of the lens unit 2 and is perpendicular to the optical axis of the lens unit 2.

In the display method of the present embodiment, the first distance (i.e., the object distance) between the display unit 1 and the lens unit 2 can be detected in real time, and the correction information is obtained according to the first distance so that the display unit 1 displays the corrected image according to the correction information. Since the corrected image is obtained essentially by correcting the original image according to the first distance, it is related to a specific value of the first distance (i.e., the object distance). Therefore, as the object distance is changed, the corrected image is also changed accordingly so that the corrected images for different first distances each can become a proper image after being processed by the lens unit 2. Therefore, the image seen by the user does not change (or less change), avoiding the visual fatigue of the user and improving the viewing experience of the user.

Optionally, as an implementation of the present embodiment, the step of calculating the correction information according to the first distance (i.e., Step S62A) includes: calculating the corrected image, as the correction information, according to the first distance and the original image (e.g., by using the prestored mapping relationship). The step of displaying the corrected image by the display unit 1 includes: displaying the corrected image in correction information by the display unit 1.

That is to say, when calculating the correction information, the manner of how to correct the original image may be determined according to the first distance, and then the original image is corrected in this manner to obtain a corrected image (i.e., the position of each point in the original image is changed), and the corrected image is directly supplied as the correction information to the display unit 1 for display. For example, a prestored mapping relationship corresponding to the first distance may be searched for in the memory, and the original image is corrected using the found mapping relationship to obtain the corrected image.

Optionally, as another implementation of the present embodiment, the step of calculating the correction information according to the first distance (i.e., Step S62A) includes: calculating a correction instruction, as the correction information, according to the first distance. For example, the correction instruction includes a prestored mapping relationship corresponding to the first distance. The step of displaying the corrected image by the display unit 1 according to the correction information (i.e., Step S63A) includes: determining whether the correction information is the correction instruction (i.e., Step S65). If the result of the determination is Yes, the method proceeds to Step S66. If the result of the determination is No, it indicates that the correction information is the corrected image. In this case, the method proceeds to Step S69. The step of displaying the corrected image by the display unit 1 according to the correction information (i.e., Step S63A) includes: correcting the original image by the display unit 1 according to the correction instruction in the correction information to obtain the corrected image, and displaying the corrected image (i.e., Step S66 to Step S69).

That is to say, the correction information may also be a corresponding correction manner (i.e., a correction instruction) calculated according to the first distance, and the correction instruction is sent to the display unit 1 so that the display unit 1 corrects the original image according to the correction instruction (for example, by a central processing unit CPU and/or a graphics processing unit GPU of the display unit 1).

Optionally, the step of calculating the correction information according to the first distance and transmitting the same to the display unit 1 (i.e., Step S62A) includes: determining whether the first distance is changed, in other words, determining whether the current first distance is changed with respect to a previous first distance (i.e., Step S62). If the result of the determination is Yes, the correction information is updated according to the changed first distance and the updated correction information is transmitted to the display unit 1 (i.e., Step S63). For example, the previous first distance may be stored in the memory. If the result of the determination is No, the correction information is obtained according to the previous first distance and the correction information is transmitted to the display unit 1 (i.e., Step S64).

That is to say, in the method, it is possible to constantly determine whether the first distance has been changed, and recalculate the correction information and transmit the updated correction information to the display unit 1 only when the first distance is changed. If the first distance has not been changed, the correction information is not updated, and the previous correction information stored in the memory may be subsequently transmitted to the display unit 1. The method has the advantage that, on one hand, the method can reduce the amount of calculation and increase the processing speed. On the other hand, the method makes the process of calculating the correction information to be independent of the process of detecting the first distance to some extent (that is, the process of calculating the correction information is a separate thread), so that even if the above distance measurement cannot be completed due to an accident, it is just that the correction instruction (the correction information) is not updated, and no error will occur to cause the process to stop.

Optionally, the step of correcting the original image by the display unit 1 according to the correction instruction in the correction information so as to obtain the corrected image (i.e., Step S66 to S68) includes: determining by the display unit 1 whether the received correction instruction is updated (i.e., Step S66); if the result of the determination is Yes, correcting the original image according to the updated correction instruction to obtain the corrected image (i.e., Step S67); if the result of the determination is No, correcting the original image according to the previous correction instruction to obtain the corrected image (i.e., Step S68). After the corrected image is obtained (i.e., Step S67 or S68), the corrected image may be displayed (i.e., Step 69).

That is to say, if the correction information is the above correction instruction, the display unit 1 may also store the previous correction information (correction instruction) in the memory; if the current correction information is not changed with respect to the previous correction information (if the correction information is not received or the received correction information is the same as the previous correction information), the original image is still corrected according to the stored previous correction information, and the original image will not be corrected using the changed (or updated) correction information until the changed (or updated) correction information is received. The above manner makes the display process independent of the process of calculating the correction information to some extent (that is, the display process is a separate thread). When new correction information cannot be calculated in time due to an accident, the display unit 1 can still work using the previous correction information, and does not affect the implementation of the basic display function.

Optionally, the step of detecting the first distance between the lens unit 2 and the display unit 1 (i.e., Step S61) includes: detecting a second distance S in a predetermined direction between the lens unit 2 and the display unit 1 using a distance sensor 31 fixedly coupled to the lens unit 2; calculating the first distance d according to the predetermined direction and the second distance S (as shown in FIG. 5).

Optionally, the step of calculating the first distance d according to the predetermined direction and the second distance S includes: calculating the first distance d according to the following formula: d=(S+$S_0$)*cos θ, where d is the first distance, S is the second distance, $S_0$ is a distance in the predetermined direction between a distance measurement starting point of the distance sensor 31 and a center plane of the lens unit 2, and θ is an angle between the predetermined direction and a direction of the first distance d, as shown in FIG. 5.

As shown in FIG. 5, generally, the distance sensor 31 may be used to detect a distance along a vertical direction (e.g., the direction of the first distance d). However, in order not to block the light emitted from the display unit 1 toward the lens unit 2 so that the light emitted from the display unit 1 can enter the lens unit 2, the distance sensor 31 may not be vertically pointed to the display unit 1. Therefore, the distance sensor 31 may be coupled to the lens unit 2 fixedly (for example, provided at an edge of the lens unit 2), and direct to the display unit 1 at a certain inclination angle (i.e., the predetermined direction) so as to measure in real time the second distance S in the predetermined direction between the distance sensor 31 and the display unit 1. Thereafter, the current first distance d between the lens unit 2 and the display unit 1 is calculated according to the second distance S and the predetermined direction (i.e., the angle θ). In an embodiment, the angle θ may be set such that the distance sensor 31 faces, for example, one end of one diameter of the lens unit 2 when the first distance d is the minimum value, and faces the other end of the one diameter of the lens unit 2 opposite to the one end when the first distance d is the maximum value.

As shown in FIG. 5, if the distance sensor 31 detects the second distance S in real time, the distance in the predetermined direction between the distance measurement starting point (e.g., an infrared light emitting lens) of the distance sensor 31 and the center plane of the lens unit 2 is $S_0$, and the angle between the distance sensor 31 and the direction perpendicular to the lens unit 2 (i.e., the direction of the first distance d) is θ, then $S_0$ and θ may be calculated by the following formulas:

$$\begin{cases} s_0 = (d_2 s_1 - d_1 s_2)/(d_1 - d_2) \\ \theta = \arccos((d_1 - d_2)/(s_1 - s_2)); \end{cases}$$

where $d_1$ and $d_2$ are two different values of the first distance measured by a conventional method after the distance sensor 31 is mounted, $S_1$ and $S_2$ are two values of the second distance measured by the distance sensor 31 in the case of the above two different values $d_1$ and $d_2$ of the first distance. Thereby, the first distance d may be calculated by using the following formula: d=(S+$S_0$)*cos θ.

Optionally, the step of obtaining the corrected image by correcting the original image according to the first distance includes: searching for prestored correction information corresponding to the first distance according to the first distance, and correcting the original image according to the correction information to obtain the corrected image. For example, the correspondence relationships between a plurality of first distances and a plurality of mapping relationships (i.e., the correction instructions) may be stored in advance in the memory.

Since the light is generally distorted after passing through the lens, the image will be deformed by the lens. Thus, if it is desired that the image is still a normal image after it is processed by the lens unit 2, the anti-distortion should be performed, that is, the image displayed by the display unit 1 (i.e., the image formed before being processed by the lens unit 2) itself is actually a deformed image. As long as the value of the first distance is determined, the relationship between the image displayed on the display unit 1 and the image formed after being processed by the lens unit 2 can be determined experimentally, that is, how the image actually displayed on the display unit 1 should be deformed can be predetermined. Therefore, the anti-distortion modes (in other words, the deformation modes) corresponding to various first distances may be prestored as correction instructions in the memory. After detecting the current first distance, the correction instruction corresponding to the current first distance is searched for, and the original image is corrected by using the found correction instruction to obtain a corrected image.

It should be understood that, the above description merely indicates how the corrected image will ultimately be derived from the original image, and does not limit in which step the above process is performed. For example, the correction instruction may be obtained in the step of calculating the correction information first, and the original image is corrected according to the correction instruction to obtain the corrected image, then the corrected image is transmitted to the display unit 1 as the correction information. Alternatively, the correction instruction may also be the correction information, and the display unit may perform calculation to obtain the corrected image according to the correction instruction.

It should be understood that the specific manner in which the corrected image is obtained by correcting the original image according to the first distance is not limited to the above manner (for example, there may be no prestored correction instructions, but may be a manner in which a corresponding instruction is calculated according to a first distance each time the first distance is measured), and detailed description thereof will not be repeated in detail here.

Figure 7:
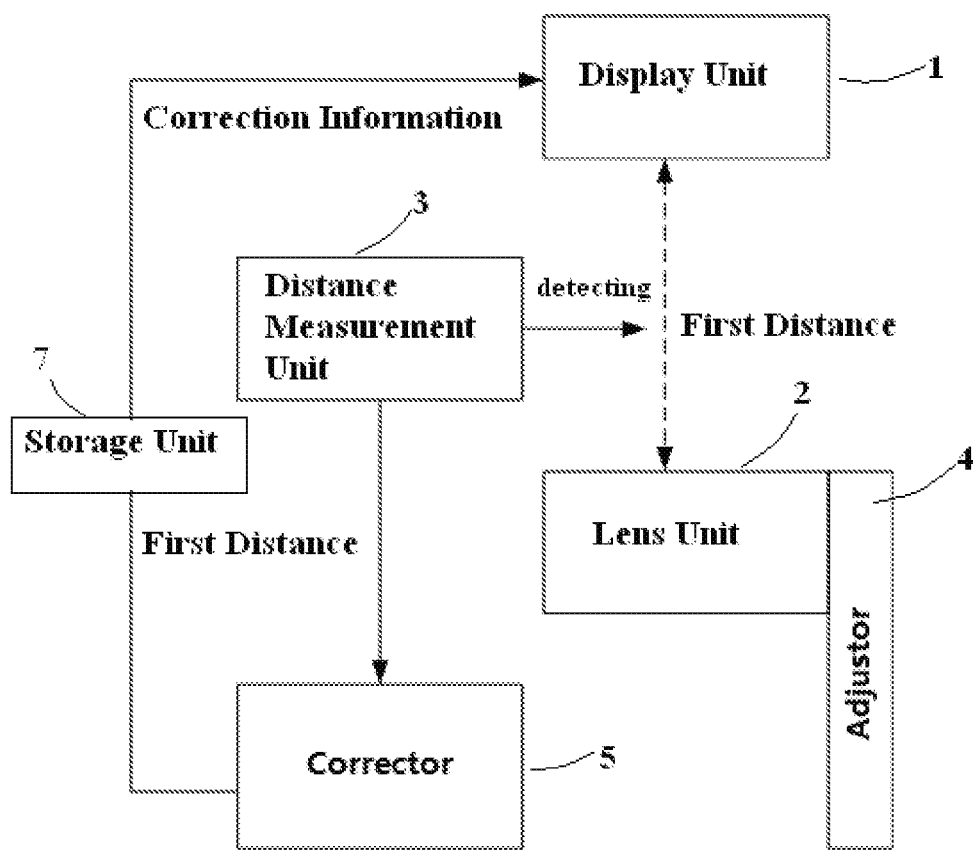
FIG. 7 is a block diagram showing components of a display device according to an embodiment of the present disclosure.

An embodiment of the present disclosure further provides a display device (for example, a VR display device), as shown in FIG. 7. The display device may include a display unit 1, a lens unit 2, an adjustor 4, a distance measurement unit 3 and a corrector 5.

The display unit 1 is configured to display a deformed image (as shown in the left portion of FIG. 2) on a light outgoing surface of the display unit 1 according to a given image to be displayed (or referred to as an original image), a first distance d and a prestored mapping relationship, so that a proper original image (as shown in the right portion of FIG. 2) is formed in a user's eyes by light from the displayed image after passing through the lens unit 2.

The lens unit 2 is configured to converge the light emitted from the display unit 1 into the user's eyes.

The adjustor 4 is configured to adjust the first distance d between the lens unit 2 and the display unit 1.

The distance measurement unit 3 is configured to detect the first distance d in real time.

The corrector is configured to calculate the correction information according to the first distance d and transmit it to the display unit 1, so as to control the display unit 1 to display a corrected image according to the correction information, wherein the corrected image is obtained by correcting the original image according to the first distance d. The corrector 5 may be implemented by hardware, software, or a combination thereof. In an embodiment, the corrector 5 may be a microprocessor, a central processing unit (CPU), an integrated circuit (IC) having the above functions, and the like; in this case, the corrector 5 may have a wired communication function or a wireless communication function. In an embodiment, the corrector 5 may be implemented by causing the central processing unit (CPU) of the display unit 1 to execute a computer program which is stored in the memory (e.g., a flash memory or other suitable non-volatile memory) of the display unit 1, such that the central processing unit (CPU) of the display unit 1 also functions as the corrector 5.

The display device of the present embodiment includes the adjustor 4 which may have a guide rail for adjusting the position of the lens unit 2 and/or the position of the display unit 1 so as to change the first distance d therebetween. In addition, the display device also includes therein the distance measurement unit 3, the corrector 5 and so on, and thus it can achieve the above display method.

It should be understood that, in the above display device, for a same original image, the virtual images, formed by the lens unit 2, of the corrected images respectively obtained for different first distances are the same, in other words, the images formed in the user's eyes are the same.

Figure 4:
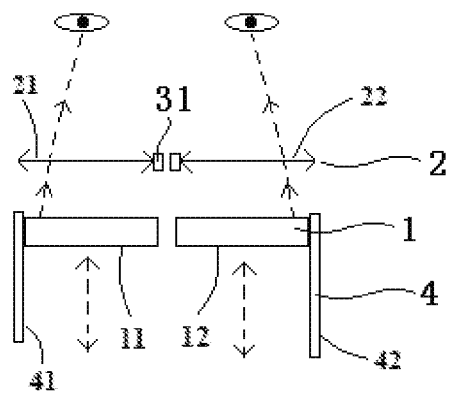
FIG. 4 is a structural diagram of a display device according to an embodiment of the present disclosure.

Optionally, the display device is a virtual reality display device, and the display unit 1 includes a first display subunit 11 and a second display subunit 12, as shown in FIG. 4.

The lens unit 2 may include: a first lens subunit (e.g., a lens) 21 which is configured to converge the light emitted from the first display subunit 11 into a user's left eye; and a second lens subunit (e.g., a lens) 22 which is configured to converge the light emitted from the second display subunit 12 into the user's right eye, as shown in FIG. 4.

Optionally, the adjustor 4 is configured to adjust a first sub-distance between the first lens subunit 21 and the first display subunit 11, and adjust a second sub-distance between the second lens subunit 22 and the second display subunit 12. The adjustment of the first sub-distance and the adjustment of the second sub-distance may be independent of each other. In an embodiment, the adjustor 4 may include a first adjustor 41 having a guide rail and a second adjustor 42 having a guide rail. At least one of the first display subunit 11 and the first lens subunit 21 may be mounted on the first adjustor 41 in a manner similar to that as described with reference to FIG. 1, and at least one of the second display subunit 12 and the second lens subunit 22 may be mounted on the second adjustor 42 in a manner similar to that as described with reference to FIG. 1. The first adjustor 41 is configured to adjust the first sub-distance between the first lens subunit 21 and the first display subunit 11, and the second adjustor 42 is configured to adjust the second sub-distance between the second lens subunit 22 and the second display subunit 12. In this way, the first sub-distance and the second sub-distance may be adjusted independently of each other.

The corrector 5 is configured to calculate first correction information according to the first sub-distance and transmit it to the first display subunit 11, so as to control the first display subunit 11 to display a first corrected image according to the first correction information, wherein the first corrected image is obtained by correcting a first original image according to the first sub-distance. The corrector 5 is further configured to calculate second correction information according to the second sub-distance and transmit it to the second display subunit 12, so as to control the second display subunit 12 to display a second corrected image according to the second correction information, wherein the second corrected image is obtained by correcting a second original image according to the second sub-distance.

That is to say, the display device of the present embodiment may be a virtual reality display device, such as VR glasses, VR helmets, or the like. In this type of display devices, each of the display unit 1 and the lens unit 2 may include two subunits. The light emitted from the two display subunits passes through the two lens subunits, respectively, and arrives at the user's left eye and right eye so that the two eyes receive different images and the user feels that a stereoscopic image is seen.

In an embodiment, the first and the second display subunits 11 and 12 may be two separate display panels. Alternatively, the first and the second display subunits 11 and 12 may be two different portions of a same display panel (such as a mobile phone panel).

That is to say, in a case that the display device has, for normal display, the above display subunit and the lens subunit, the distances (the first distances) between the two lens subunits and corresponding display subunits can be individually adjusted, respectively, thereby obtaining two sub-distances independent of each other. Then, two pieces of correction information are calculated so that they can be used to respectively correct the images displayed by the two display subunits to ensure that the virtual images, formed by corresponding lens subunits, of the images respectively displayed on the two display subunits are unchanged; in other words, to ensure that the images formed in the user's eyes are the same in case of different first distances.

Optionally, the correction information includes the correction instruction. The corrector 5 is further configured to determine whether the first distance d is changed. If the result of the determination is Yes, new correction information is calculated according to the changed first distance d and is transmitted to the display unit 1.

Optionally, the correction information includes the correction instruction, and the display unit 1 is further configured to determine whether the correction information is updated. If the result of the determination is Yes, the original image is corrected to obtain the corrected image according to the updated correction instruction. If the result of the determination is No, the original image is corrected to obtain the corrected image according to the last received correction instruction. For example, the display unit 1 may be connected to its manufacturer's website to detect whether there is a new mapping relationship from the original image to the corrected image. If such a new mapping relationship exists, it is downloaded and saved in the memory of the display unit 1 as an updated correction instruction.

That is to say, in a case that the correction information includes the correction instruction, the corrector 5 and the display unit 1 may work in the above "separate-thread" manner to improve the reliability of the system.

Optionally, as an implementation of the present embodiment, the display device further includes a display unit 1 which is electrically connected to the corrector 5. For example, the display device may be a VR helmet.

That is to say, as shown in FIG. 7, the display device may have the display unit 1 built therein; for example, the display device is a VR helmet. For example, the display unit 1 may be two micro display panels mounted in the VR helmet. In this case, the display unit 1 may be electrically connected to the corrector 5 directly.

Optionally, as another implementation of the present embodiment, the display device may further include a mounting unit 6 for detachably mounting the display unit (e.g., a mobile phone) 1. For example, the display device may be VR glasses. The user mounts the display unit such as the mobile phone in the mounting unit 6 before watching video, and takes the mobile phone out of the mounting unit 6 after the video ends.

Optionally, in a case that the corrector 5 is a hardware component and is separated from the display unit 1, the corrector 5 is configured to transmit the correction information to the display unit 1 wirelessly. Alternatively, the corrector 5 may be a software component and provided in the display unit 1, and in this case the corrector 5 may transmit the correction information to the display unit 1 via the bus of the display unit 1.

Figure 8:
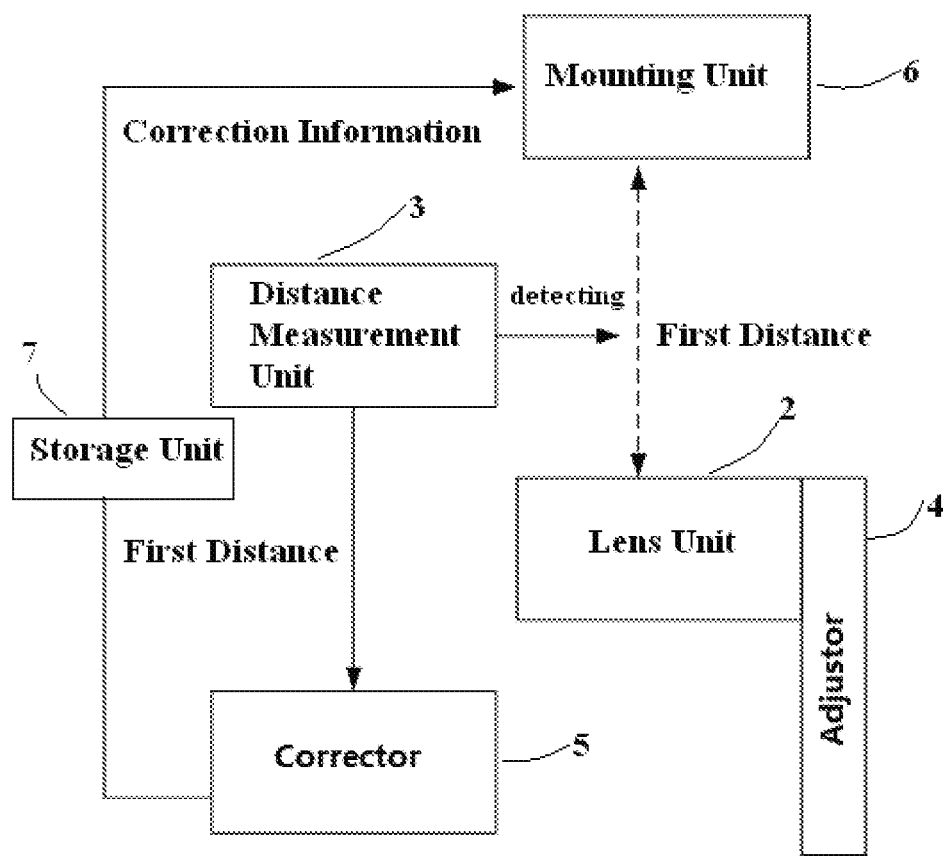
FIG. 8 is a block diagram showing components of another display device according to an embodiment of the present disclosure.

That is to say, as shown in FIG. 8, the display device itself may not include the display unit 1 (but the display unit 1 is also required to be configurable to operate in the above manner), but only the mounting unit 6 for mounting an additional display unit 1. For example, the display device may be VR glasses having a mounting unit (or a support) 6 or the like for mounting the display unit 1, and the display unit 1 may be a mobile phone or the like that may be mounted on the above support. In an embodiment, the mounting unit 6 may be mounted on the adjustor 4 in a manner similar to that described with reference to FIG. 1, such that the first distance (i.e., the object distance) d between the mounting unit 6 (i.e., display unit 1) and the lens unit 2 may be adjusted by the adjustor 4. Since the display unit 1 can be taken out from the display device in this case, it may be inconvenient for the display unit 1 to be connected to the corrector 5 with a wire. Thus, the corrector 5 and the display unit 1 may be connected to each other and data may be transmitted therebetween in a wireless manner (such as by wife, Bluetooth, etc.).

Figure 9:
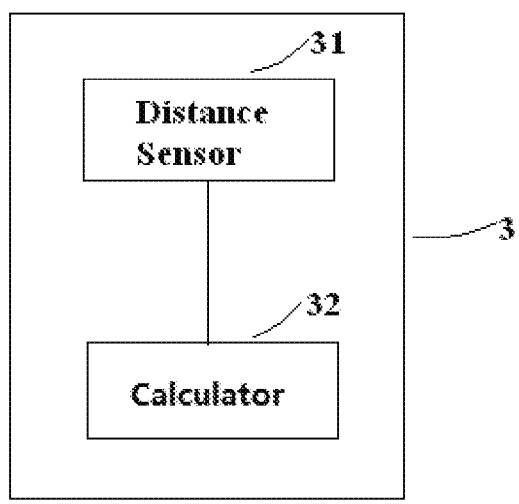
FIG. 9 is a block diagram showing components of a distance measurement unit according to an embodiment of the present disclosure.

Optionally, the distance measurement unit 3 includes: a distance sensor 31 fixedly coupled to the lens unit 2 and configured to detect a second distance S in a predetermined direction between the lens unit 2 and the display unit 1; and a calculator (for example, microprocessor) 32 configured to calculate the first distance d using the formula as described above according to the predetermined direction and the second distance S, as shown in FIG. 9.

Optionally, the distance sensor 31 is an infrared distance sensor.

That is, the distance measurement 3 may include the above distance sensor 31. Since above first distance d is generally small, an infrared distance sensor may be employed as distance sensor 31 in view of various aspects such as the suitability, the cost, and the like.

Optionally, the display device may further include: a memory 7 prestoring therein correction instructions (such as the mapping relationships) corresponding to various first distances d, and other programs and data required for realizing the normal display. The memory 7 may be different from the memory in the display unit 1, and separated from the display unit 1. The memory 7 may be a non-volatile memory such as a hard disk, a flash memory, or the like. The memory 7 may be connected to the corrector 5 and the display unit 1. Alternatively, the memory 7 may be the memory in the display unit 1. The step of obtaining the corrected image by correcting the original image according to the first distance d includes: searching for, by the corrector 5 according to the first distance d, the prestored correction instruction corresponding to the first distance d, and correcting the original image according to the found correction instruction, to obtain a corrected image. The corrected image may be transmitted directly to the display unit 1, or may be stored in the memory 7 and then transmitted to the display unit 1 later.

That is to say, the display device may include the memory 7 stored therein a plurality of first distances, a plurality of correction instructions, and correspondence relationships between the plurality of first distances and the plurality of correction instructions, thereby obtaining the corrected image from the original image in the above manner.

The display device according to an embodiment of the present disclosure can perform display with a constant depth of field even if the object distance is changed, causing the user to see a same image, thereby avoiding the visual fatigue of the user.

It should be understood that the above implementations are only exemplary implementations for illustrating the principle of the present disclosure. However, the present disclosure is not limited thereto. One of ordinary skill in the art can make various modifications and improvements to the present disclosure without departing from the spirit and the essence of the present disclosure. These modifications and improvements should be also considered as falling within the protection scope of the present disclosure.

What is claimed is:

1. A display method for a display device having a lens unit and a display unit, comprising:
    detecting a first distance between the lens unit and the display unit;
    calculating correction information according to the first distance and transmitting the correction information to the display unit; and
    displaying a corrected image by the display unit according to the correction information, so that the corrected image is converged into eyes of a user via the lens unit, wherein the corrected image is obtained by correcting an original image according to the first distance.

2. The display method of claim 1, wherein,
    the calculating the correction information according to the first distance comprises: calculating the corrected image, as the correction information, according to the first distance and the original image; and
    the displaying the corrected image by the display unit according to the correction information comprises: displaying the corrected image by the display unit.

3. The display method of claim 1, wherein,
    the calculating the correction information according to the first distance comprises: calculating a correction instruction, as the correction information, according to the first distance; and
    the displaying the corrected image by the display unit according to the correction information comprises: obtaining the corrected image by correcting the original image by the display unit according to the correction instruction and displaying the corrected image by the display unit.

4. The display method of claim 3, wherein the calculating correction information according to the first distance and transmitting the correction information to the display unit comprises:
    determining whether the first distance is changed with respect to a previous first distance;
    when the first distance is changed with respect to the previous first distance, updating the correction information according to a changed first distance and transmitting the updated correction information to the display unit.

5. The display method of claim 3, wherein the obtaining the corrected image by correcting the original image by the display unit according to the correction instruction comprises:
    determining, by the display unit, whether a received correction instruction is updated with respect to a previous correction instruction;

when the received correction instruction is updated with respect to the previous correction instruction, correcting the original image according to the updated correction instruction to obtain the corrected image.

6. The display method of claim 1, wherein the detecting the first distance between the lens unit and the display unit comprises:
detecting a second distance in a predetermined direction between the lens unit and the display unit using a distance sensor fixedly coupled to the lens unit; and
calculating the first distance according to the predetermined direction and the second distance.

7. The display method of claim 6, wherein the calculating the first distance according to the predetermined direction and the second distance comprises:
calculating the first distance by a formula of $d=(S+S_0)*\cos\theta$, where d is the first distance, S is the second distance, $S_0$ is a distance in the predetermined direction between a distance measurement starting point of the distance sensor and a center plane of the lens unit, and $\theta$ is an angle between the predetermined direction and a direction of the first distance.

8. The display method of claim 1, wherein obtaining the corrected image by correcting an original image according to the first distance comprises:
searching for prestored correction information corresponding to the first distance according to the first distance; and
correcting the original image according to the correction information to obtain the corrected image.

9. A display device comprising:
a lens unit configured to converge light emitted from a display unit into eyes of a user;
an adjustor configured to adjust a first distance between the lens unit and the display unit;
a distance measurement unit configured to detect the first distance; and
a corrector configured to calculate correction information according to the first distance and transmit the correction information to the display unit so as to control the display unit to display a corrected image according to the correction information, wherein the corrected image is obtained by correcting an original image according to the first distance.

10. The display device of claim 9, wherein,
the display device is a virtual reality display device, the display unit comprises a first display subunit and a second display subunit; and
the lens unit comprises:
a first lens subunit configured to converge light emitted from the first display subunit into a left eye of the user; and
a second lens subunit configured to converge light emitted from the second display subunit into a right eye of the user.

11. The display device of claim 10, wherein,
the adjustor is configured to adjust a first sub-distance between the first lens subunit and the first display subunit, and adjust a second sub-distance between the second lens subunit and the second display subunit, the first sub-distance and the second sub-distance are adjusted independently of each other; and
the corrector is configured to calculate first correction information according to the first sub-distance and transmit the first correction information to the first display subunit so as to control the first display subunit to display a first corrected image according to the first correction information, wherein the first corrected image is obtained by correcting a first original image according to the first sub-distance; the corrector is further configured to calculate second correction information according to the second sub-distance and transmit the second correction information to the second display subunit so as to control the second display subunit to display a second corrected image according to the second correction information, wherein the second corrected image is obtained by correcting a second original image according to the second sub-distance.

12. The display device of claim 11, wherein,
the adjustor comprises a first adjustor having a guide rail and a second adjustor having a guide rail;
at least one of the first display subunit or the first lens subunit is mounted on the first adjustor via a fastener; and
at least one of the second display subunit or the second lens subunit is mounted on the second adjustor via a fastener.

13. The display device of claim 9, wherein,
the correction information comprises a correction instruction;
the corrector is further configured to determine whether the first distance is changed with respect to a previous first distance;
in a case that the first distance is changed with respect to the previous first distance, the corrector updates the correction information according to a changed first distance and transmit the updated correction information to the display unit; and
in a case that the first distance is not changed with respect to the previous first distance, the corrector obtains the correction information according to the previous first distance and transmit the correction information to the display unit.

14. The display device of claim 9, wherein,
the correction information comprises a correction instruction;
the corrector is further configured to determine whether a received correction instruction is updated with respect to a previous correction instruction;
in a case that the received correction instruction is updated with respect to the previous correction instruction, the display unit corrects the original image according to the updated correction instruction to obtain the corrected image; and
in a case that the received correction instruction is not updated with respect to the previous correction instruction, the display unit corrects the original image according to the previous correction instruction to obtain the corrected image.

15. The display device of claim 9, further comprising:
the display unit which is electrically connected to the corrector.

16. The display device of claim 9, further comprising:
a mounting unit for detachably mounting the display unit.

17. The display device of claim 16, wherein,
the corrector is configured to transmit the correction information wirelessly to the display unit.

18. The display device of claim 9, wherein the distance measurement unit comprises:
a distance sensor fixedly coupled to the lens unit and configured to detect a second distance in a predetermined direction between the lens unit and the display unit; and a calculator configured to calculate the first distance according to the predetermined direction and the second distance.

19. The display device of claim 18, wherein, the distance sensor is an infrared distance sensor.

20. The display device of claim 9, further comprising:
a memory prestoring therein a plurality of first distances, a plurality of correction instructions, and correspondence relationships between the plurality of first distances and the plurality of correction instructions;
wherein the corrector searches for a prestored correction instruction corresponding to a current first distance according to the current first distance, and corrects the original image according to the found correction instruction to obtain the corrected image.

* * * * *